Patented Apr. 28, 1936

2,038,755

UNITED STATES PATENT OFFICE 2,038,755

PIGMENT PASTE

Edgar Hugo Nollau, Wilmington, Del., assignor to E. I. du Pont de Nemours & Company, Wilmington, Del., a corporation of Delaware No Drawing. Application February 27, 1934, Serial No. 713,130

5 Claims. (Cl. 134—79)

This invention relates to the preparation of so-called pigment paste for use in the paint, varnish or enamel industry and the coated fabric industry, or wherever pigment pastes are used, and more particularly to the preparation of pigment dispersed in a suitable vehicle for use in preparing compositions commonly used in the coated fabric industry.

So-called grinding or dispersing of pigments in various vehicles is a practice well known in the arts where pigments are commonly used. The equipment used for grinding the pigments is of several kinds such as buhr stone mills, roller mills, ball and pebble mills, and various modifications of these. Experience has shown that the choice of method used for grinding or dispersing the pigments depends to a large extent on the type of vehicle in which it is desired to grind or disperse the pigment.

Roller mills are suitable for grinding pigments in the various varnish vehicles or in non-drying or semi-drying oils as for example, castor oil or cotton seel oil, either raw or treated. Buhr stone mills are used where extreme dispersion is desired, but here the rate of production is rather low. Ball and pebble mills are used where production is an important factor and where, for most types of vehicle, only fair dispersion is required. Pigments are also ground in these various mills where the vehicle may be a plasticizer such as tri-cresyl-phosphate, di-butyl-phthalate, etc., or a resin either natural or synthetic.

The factors of production, cost, quantities desired, etc., are all important in the choice of the method for grinding, but the type of vehicle in which it is desired to disperse the pigment governs probably to the greatest extent the choice of the equipment to be used. Each type of mill has its advantages and disadvantages. The grinding of pigments in castor oil, in a ball mill for example is not a very efficient procedure. The degree of dispersion obtained is not satisfactory for many purposes. One of the controlling factors here is the variation of so-called oil absorption, that is, quantity of vehicle required for a unit quantity of dry pigment to produce a paste of given consistency. Each pigment has its specific oil absorption which must be taken into account in the grinding operation.

This oil absorption ratio varies from about .50 part of oil to one part of pigment in the case of ZnO white to approximately 2 parts of oil to one part of pigment in the case of black. If more pigment is added a thick mud is formed in which some of the pigment is not wetted and if used in this condition the coated material will have streaks of dry pigment.

The object of this invention is to increase this ratio to such an extent that very much more pigment may be incorporated in a given amount of vehicle, and with this difficulty overcome, definite and increased amounts of practically any pigment can be incorporated in a given amount of vehicle without danger of exceeding its permissible specific oil absorption.

This object is accomplished according to the present invention by the use of a special grinding vehicle which satisfactorily wets the various colored pigments and produces a finished paste having a constant pigment-vehicle ratio for all colors. This result cannot be produced by grinding the pigment in a vehicle consisting of oil, plasticizer or resin alone. More particularly, the invention comprises a pigment paste of uniform quality and pigment content which is admirably adapted for use in producing coated fabrics of the cellulose derivative type of uniformly high quality.

According to the present invention it has been found that if a special vehicle is substituted for the prior art oils, the above object can readily be realized. This vehicle contains softener, plasticizer or resin and a low concentration cellulose derivative dispersion. These materials are placed in a ball or pebble mill and to this is added the dry pigment. If desired the dry pigment may be added first and the vehicle later, although the procedure just mentioned is preferable. The pigment and vehicle are then ground or dispersed by the conventional manner of running the mill for varying lengths of time, depending upon or varying with the type of pigment. The controlling factor here is the so-called hardness of the pigment. This property is well known to those versed in the art of grinding pigments and its importance will be readily recognized.

It has been found in practice that ball or pebble mills holding a maximum load of 100 gallons of pigment paste can satisfactorily disperse a charge of pigment in the vehicle in from five to eight hours, the mills revolving at a rate of between 27 and 38 R. P. M. After proper dispersion has been obtained the mill is emptied in the conventional manner. The paste so prepared has the proper consistency to be later easily mixed with the other ingredients of the coating composition resulting in a complete dispersion of the pigment particles throughout the final coating composition, is easily handled and can be satisfactorily stored.

The pigment content in the finished paste may vary between 55 and 72%, the oil, plasticizer, or resin between 27.5 and 32.5% and the cellulose derivative dispersion between 2.5 and 30.0% (0.10 to 1.29% as solid cellulose derivative). These variations will depend on the particular pigment which it is desired to disperse. The formulations are so adjusted as to always retain a constant pigment-oil, plasticizer, or resin ratio in the finished paste. For example, in preparing a lithopone pigment paste the following formulation is used:

| | Pounds |
|---|---|
| Lithopone | 62 |
| Raw castor oil | 31 |
| 5 oz. cellulose nitrate dispersion | 7 |

More pigment can be introduced if desired so as to increase the lithopone-oil ratio to 3:1. For Chrome Orange paste a satisfactory formulation has been found to be:

| | Pounds |
|---|---|
| Chrome Orange | 57.5 |
| Barytes | 5.8 |
| Raw castor oil | 31.7 |
| 5 oz. cellulose nitrate dispersion | 5.0 |

For Alizarine Lake paste the following formulation has been found satisfactory:

| | Pounds |
|---|---|
| Alizarine Lake | 11.7 |
| Barytes | 35.0 |
| Raw castor oil | 23.3 |
| 5 oz. cellulose nitrate dispersion | 30.0 |

The cellulose nitrate dispersion is made by dispersing or dissolving the cellulose derivative in a suitable dispersing medium or solvent. For example, in preparing the 5 oz. cellulose nitrate dispersion, 5 oz. of dry cellulose nitrate having a viscosity characteristic of from two to four seconds (as determined by the falling sphere method) is dissolved in one gallon of a mixture of ethyl acetate 40%, denatured ethyl alcohol 60%. Preparation of such dispersion or solution is well known in the art and forms no particular part of the present invention. Such dispersion can be prepared for stock and used as required.

It will be seen from the above that the permissible ratio of pigment to oil has been greatly increased over that of the prior art, although the reason for it is not altogether apparent.

Ball mills have been found to be the most convenient for grinding or dispersing the pigment in the special vehicle. The mill may be porcelain lined or not or may use steel balls or pebbles. The choice depends on the nature of the pigment and economic factors, and if necessary, roller mills or buhr stone mills can be used.

While raw castor oil has been mentioned in the examples given above, I do not wish to limit myself to this softener. Other softeners, for example blown or treated castor oil, cotton seed oil, or rape seed oil, can be satisfactorily used. As examples of plasticizers may be mentioned tri-cresyl-phosphate, di-butyl-phthalate, and di-butyl-tartrate. As resins may be mentioned those of the fatty oil modified polyhydric alcohol-polybasic acid type, "Paraplex" resins which is understood to be a glycol sebacate condensation product, etc. For the cellulose derivative dispersion which, with the particular oils, softener, or resin as the composite grinding vehicle, forms the integral part of this invention, cellulose nitrate has been found to give excellent results. However, other derivatives of cellulose can be used as cellulose acetate, cellulose ether, or ethyl cellulose. The solvent or dispersing medium used will be governed largely by the cellulose derivative used and the choice will be readily apparent to those skilled in the art of preparing such dispersion. The concentration of the dispersion may also be varied from a 1 oz. to 6 oz. inclusive, depending on the viscosity characteristic of the cellulose derivative.

This invention has been used principally in the manufacture of coated fabrics of the cellulose derivative type. It is also applicable, however, in the manufacture of various oil type coating compositions in the paint and varnish industry as well as in the lacquer and enamel industry.

Due to the varying absorptions of different vehicles by various pigments, it is not practicably possible to grind or disperse pigments of all colors or even fillers in a constant ratio of pigment to vehicle. This varying pigment-vehicle ratio introduces difficulties in the manufacture of compositions which are to be applied to fabrics so that a uniform finished product cannot be obtained in different colors. This variation in pigment content of the protecting film causes variations in the initial quality of the product as well as in actual service which detracts from the production of a product of uniform quality. The present invention provides for the addition of pigment paste to coating composition such that the various colored compositions will have a uniform pigment content and the pigment content will bear a uniform relation to the other solid ingredients in the film. Another advantage is that such a constant pigment-vehicle paste allows the use of larger quantities of pigment in coating compositions without introducing an excessive amount of softener, plasticizer, or resin which might produce undesirable properties in the finished film such as stickiness, poor resistance to service, etc. The introduction of larger quantities of pigment in the coating composition in addition to its effect on quality has an economical advantage in that it replaces some of the more expensive ingredients. Another advantage of the invention is that it allows more economical storage of pigment paste in that a given volume of pigment paste contains a greater volume of dry pigment and so does not necessitate the carrying of such large quantities of stock paste. The economic advantage of reduced storage capacity and reduced inventory is obvious.

It is apparent that many widely different embodiments of this invention may be made without departing from the spirit and scope thereof, and, therefore, it is not intended to be limited except as indicated in the appended claims.

I claim:

1. A pigment paste containing from 2.5 to 30% of a cellulose derivative dispersion, said dispersion containing .10 to 1.29% solid cellulose derivative.

2. A grinding vehicle comprising a semi or non-drying oil, and 5 to 30% of a cellulose nitrate 5 oz. dispersion.

3. A grinding vehicle comprising a mixture containing from 70 to 95% castor oil and from 5 to 30% of a 5 oz. dispersion of cellulose nitrate.

4. In the process of grinding pigments in a liquid vehicle containing a semi-drying or non-drying oil, the step of adding thereto a thin dispersion of a cellulose derivative.

5. A pigment paste containing from 55 to 72% pigment, 27.5 to 32.5% of compounds selected from the class consisting of non-drying oils, semi-drying oils, plasticizers and resins and from 2.5 to 30.0% cellulose derivative dispersion containing from .10 to 1.29% solid cellulose derivative.

EDGAR HUGO NOLLAU.